Figure 1:
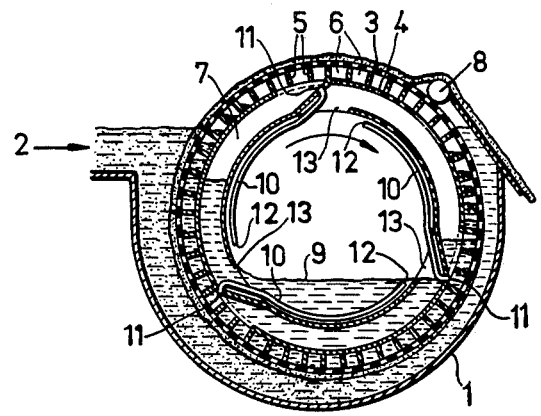

June 28, 1966   E. S. ERIKSSON   3,258,125
SELF-SUCTION FILTERING DEVICE
Filed July 26, 1962

United States Patent Office 3,258,125
Patented June 28, 1966

3,258,125
SELF-SUCTION FILTERING DEVICE
Erik Sture Eriksson, Skonsberg, Sweden, assignor to Sunds Verkstader Aktiebolag, Sundsbruk, Sweden
Filed July 26, 1962, Ser. No. 212,645
Claims priority, application Sweden, July 27, 1961, 7,682/61
1 Claim. (Cl. 210—396)

In dewatering liquid-containing mixtures of substances, particularly suspensions of cellulose fiber pulp, it is known to use filtering devices of the type having a filtering drum, which is intended to rotate partially immersed in the liquid-containing mixture of substances. A filtering drum of that kind comprises an outer, pervious shell and an inner, impervious shell, there being between said two shells partitions extending in the longitudinal direction of the drum substantially rectilinearly or helically and dividing the interspace between the shells into so-called suction cells. The suction cells are connected to suction or discharge ducts, which curve backwards with respect to the direction of rotation of the drum and in which the vacuum is generated upon rotation of the drum in the liquid-containing mixture of substances. In such a filtering device, which is of the so-called self-sucking type, there will readily occur, in dewatering fibrous pulp suspensions, immediately before the place where the formed and dewatered web of pulp is taken off the filtering drum a rewetting, so-called back-wash, which is caused by the fact that there will not be sufficient time for the suction cells and/or the suction or discharge ducts to become completely emptied of filtrate. This is due to the fact that the air required for emptying the suction cells and/or the suction or discharge ducts has to pass counter the flow of filtrate within the suction or discharge ducts, because, normally, the web of pulp does not allow a sufficient quantity of air to pass therethrough. This will result partly in the time of emptying becoming extended at the cost of the time of dewatering, partly in difficulties occurring in taking off the web of pulp from the filtering drum, because of remaining vacuum in cells and/or ducts.

The present invention has for its object means to overcome the abovementioned drawbacks. This is obtained substantially in such a manner that for accelerating the removal of filtrate that has entered suction cells and/or suction or discharge ducts, air or some other suitable gaseous medium is caused, at a desired, suitable point of time during the rotation of the filtering drum, to penetrate into the suction cells and/or into the suction or discharge ducs, preferably into those portions of the ducts located next to the suction cells. The provision may be made that with the filtering drum there are combined members, by means of which the suction cells and/or the suction or discharge ducts may, at suitable points of time during the rotation of the drum, be supplied with a gaseous medium, for example water vapor or air. The members for supplying the gaseous medium comprise a number of ducts, preferably in the shape of pipes—below simply called air ducts—each of which is provided with at least one intake opening and at least one outlet opening for the gaseous medium to be supplied, the intake opening of the air duct being, with respect to the direction of rotation of the filtering drum, located before the filtrate outlet opening of a suction or discharge duct, and the outlet opening of the air duct opening out into the suction or discharge duct at or adjacent the filtrate inlet opening thereof and/or into suction cells connected to the suction or discharge duct. The purpose hereof is that during the rotation of the drum the intake opening of the air duct shall, when ascending, leave the level of filtrate within the drum before the filtrate outlet opening of the suction or discharge duct and that the prevailing difference in height of static pressure shall result therein that air will be sucked into the air duct and that the suction cells will be supplied with the quantity of air required for a quick and effective removal of filtrate. It is suitable to provide each air duct in such a manner that it extends along that face of a suction or discharge duct which is turned towards the interior of the filtering drum. The invention also includes the possibility of providing mechanically operated valves for introducing the required quantity of air into the suction cells and/or into that part of each suction or discharge duct which is located next to the periphery of the filtering drum, said valves being meant to be opened just before the place where the web of pulp is taken off the drum and to be closed again after said place. Such valves may be embodied as pendulum valves or they may be spring-loaded and actuatable by a stationary opening member. Finally, the desired emptying effect may also be obtained by blowing away or flushing away part of the web of material formed on the filtering drum at or adjacent the very place where the web is taken off the filtering drum.

Figure 2:
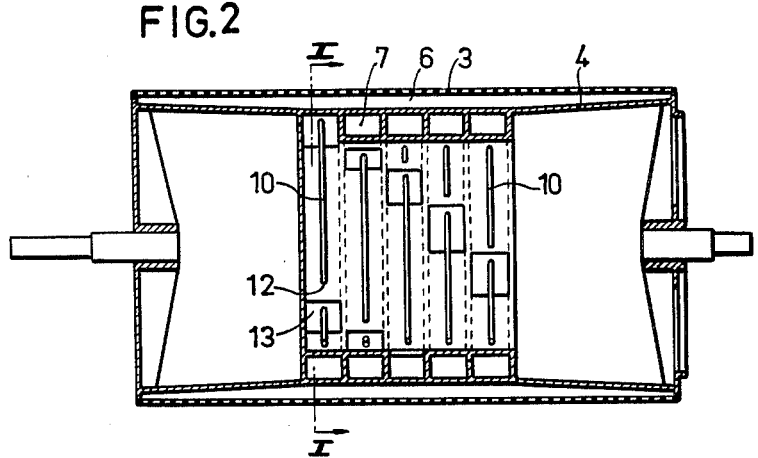

An embodiment of a filtering drum arranged in accordance with the invention and with air ducts provided therein is shown in the accompanying drawing. FIG. 1 shows a transverse cross section of a filtering drum in operation, FIG. 2 showing only a filtering drum in a longitudinal section. The transverse cross section of the filtering drum shown in FIG. 1 is meant to be a section on line I—I in FIG. 2.

Referring to the drawing reference numeral 1 designates a trough, into which the fibrous pulp suspension is introduced as at 2. In the trough there is immersed a rotary filtering drum having an outer shell 3 provided with screening openings and an inner shell 4 without such openings. The interspace between the shells 3 and 4 is, by means of partitions 5, divided into a number of suction cells 6 extending along the whole length of the drum, said suction cells being connected to suction or discharge ducts 7 curving backwards with respect to the direction of rotation of the drum, which is indicated by an arrow. In the example shown three suction cells are connected to one and the same suction or discharge duct but the number of suction cells for each suction or discharge duct may be less or more than three. A roll for taking off the web of material formed on the drum is indicated by 8 and the level of filtrate within the drum by 9. 10 designates ducts or conduits for air or some other suitable gas. Each of said ducts or conduits preferably is in the shape of a pipe. Each such pipe 10, extending along that side of the adjoining suction or discharge duct which is turned towards the interior of the drum, has two openings, one of which, the outlet opening, designated by 11, is shown to open into the suction or discharge duct 7 adjacent the inlet opening thereof, the other, the intake opening, designated by 12, being located at a suitable distance before the outlet opening 13 of the suction or discharge duct with respect to the direction of rotation of the filtering drum.

The mode of operation of the device is as follows:

The water penetrating through the outer pervious drum shell 3 will first fill the suction cells 6 and then the suction or discharge ducts 7. In the position of the filtering drum shown in FIG. 1 the lowermost suction or discharge duct with adjoining suction cells and air duct is completely filled with filtrate. The left-hand suction or discharge duct in the figure is partially emptied, and hence also the air duct and the suction cells are completely emptied. When the lower opening of the air duct has left the level of filtrate 9 within the drum, air is sucked through the air duct up to the suction cells and/or to the suction or discharge duct as long as the emptying of the filtrate is in progress, which will result in the suction cells and/or the suction or discharge duct becoming effectively emptied. By choosing a suitable dimension of the air ducts and/or a suitable distance between the intake opening of each air duct and the outlet opening of the respective suction or discharge duct the time for emptying the ducts may be controlled. It is of course also possible to provide each air duct with a valve so that the cross sectional area of flow may be adjusted to any desired, suitable size. The distance between the intake opening of an air duct and the outlet opening of the respective suction or discharge duct is chosen in such a way that the vacuum will be maintained as close as possible to the take-off roll with a view to obtaining a practically complete drainage.

The air duct also may arranged in that way that it is wholly or partially located outside the filtering drum, the intake opening for the air being kept closed during part of the revolution of the drum by means of a liquid or a mixture of substances outside the filtering drum.

Mechanically operated valves, one valve for each group of cells, preferably are provided on the outside of one end wall of the filtering drum, the air ducts extending through said end wall. The stationary opening member, actuating the valves, preferably is made adjustable in the peripheral direction of the drum so that the supply of air to the cells may be controlled in such a manner that it will take place at a suitable distance before the place where the web of material is taken off the drum and/or after said place.

Of course, the invention also includes the possibility of providing a plurality of air ducts in connection to one and the same suction or discharge duct.

Having now described my invention, what I claim as new and desire to secure by letters patent is:

A self-suction filtering device for liquid suspensions, comprising
- a trough adapted to contain liquid suspension; means for supplying liquid suspension to said trough;
- a filtering drum mounted in said trough and rotatable on a substantially horizontal axis whilst partially immersed in such liquid suspension;
- means for discharging filtrate into the interior space of said drum;
- and means for removing solid material from the outer surface of said drum;
- said drum comprising an outer shell having a pervious, substantially cylindrical side wall and a wall, at each end thereof, which is perpendicular to said axis;
- at least one of said end walls having an opening therein;
- an inner shell having an impervious side wall of circular cross-section spaced apart from the cylindrical side wall of said outer shell;
- suction cells arranged adjacent to the periphery of the drum and extending longitudinally of the latter;
- filtrate-discharge ducts each communicating with at least one of said suction cells, said filtrate-discharge ducts curving backward with respect to the direction of rotation of the drum and hence being adapted to generate a predetermined vacuum in said ducts and associated suction cells and having terminal openings communicating with the free interior space of the drum;
- means for accelerating and facilitating the removal of filtrate from the interior of said suction cells, said means comprising
- supply ducts each having at least one intake opening and at least one outlet opening,
- the outlet of each of said supply ducts communicating with a respective suction cell for supplying to said cell a gaseous medium from the interior space of the drum;
- the effective length of said supply ducts being shorter than said filtrate-discharge ducts and the intake opening of each supply duct being, with respect to the direction in which the filtering drum is adapted to rotate, positioned in the interior space ahead of the outlet opening of the filtrate-discharge duct of the respective appertaining suction cell;
- and each supply duct being adapted to supply gaseous medium to said suction cell at a place of the drum having a suitable location ahead of the place of removal of the drained coherent layer from the outer surface of the drum;
- each of said suply ducts extending, separate from its respective appertaining filtrate-discharge duct, into the free interior space of the drum and communicating with the free interior space of the drum at such a place that upon rotation of the drum said inlet end is positioned beneath the filtrate level in said drum during the completion of said predetermined vacuum in said discharge duct and positioned above said filtrate level immediately after said predetermined vacuum has been reached.

References Cited by the Examiner

UNITED STATES PATENTS

| 2,537,414 | 1/1951 | Lindblad | 210—386 X |
| 2,732,080 | 1/1956 | Strindlund | 210—402 |
| 2,732,081 | 1/1956 | Strindlund | 210—404 |

FOREIGN PATENTS

| 1,252,407 | 12/1960 | France. |
| 756,763 | 9/1956 | Great Britain. |

REUBEN FRIEDMAN, *Primary Examiner.*

HERBERT L. MARTIN, *Examiner.*

S. ZAHARNA, *Assistant Examiner.*